United States Patent
Choi et al.

(10) Patent No.: US 6,363,754 B2
(45) Date of Patent: *Apr. 2, 2002

(54) MCVD METHOD AND APPARATUS USING AN ELONGATED GAS FEEDING DEVICE

(75) Inventors: Mansoo Choi, 302-608 Woosung Apt., Sadang 2-dong, Dongjak-gu, Seoul; Dong-geun Lee, Gwacheon, both of (KR)

(73) Assignee: Mansoo Choi, Seoul (KR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/338,070

(22) Filed: Jun. 23, 1999

(30) Foreign Application Priority Data

Jun. 24, 1998 (KR) .............................. 98-23926

(51) Int. Cl.[7] .............................................. C03B 37/018
(52) U.S. Cl. ................................ 65/417; 65/418; 65/530
(58) Field of Search ........................... 65/418, 553, 417

(56) References Cited

U.S. PATENT DOCUMENTS

| 4,117,802 A | * 10/1978 | Le Sergent | 65/418 |
| 4,233,045 A | * 11/1980 | Sarkar | 65/418 |
| 4,235,616 A | * 11/1980 | Siegfried | 65/418 |
| 4,389,229 A | * 6/1983 | Jang | 65/418 |
| 4,457,770 A | * 7/1984 | Faure | 65/418 |
| 4,826,288 A | * 5/1989 | Mansfield | 65/418 |

FOREIGN PATENT DOCUMENTS

| DE | 2531237 | * 1/1977 | 65/418 |
| DE | 2930781 | * 2/1981 | 65/418 |
| JP | 5271249 | * 6/1977 | 65/418 |
| JP | 5417746 | * 2/1979 | 65/417 |
| WO | 89102419 | * 3/1989 | 65/418 |

* cited by examiner

Primary Examiner—John Hoffmann
(74) Attorney, Agent, or Firm—Knobbe, Martens, Olson & Bear, LLP

(57) ABSTRACT

An apparatus for manufacturing optical fibers includes an external circular tube into which reactant gases are introduced from an entrance at one end thereof. An internal circular tube is inserted into the external circular tube through an exit at the other end of the external circular tube. The internal circular tube has a bore to which gas jets are supplied. Jet holes are formed to lead to the bore on the outer circumferential surface in the vicinity of the front end of the internal circular tube. The jet holes are for radially jetting the gas jets. An auxiliary jet hole is formed at the front end of the internal circular to tube to lead to the bore. The auxiliary jet hole is for jetting the gas jets frontward. A torch is installed to reciprocate along the axial direction of the external circular tube, for heating the external circular tube to induce a chemical reaction of the reactant gases to thus generate particles.

4 Claims, 3 Drawing Sheets

MCVD METHOD AND APPARATUS USING AN ELONGATED GAS FEEDING DEVICE

BACKGROUND OF THE INVENTION

1. Field of the Invention

The present invention relates to an apparatus and method for manufacturing optical fibers, and more particularly, to an apparatus and method for manufacturing optical fibers by a so-called modified chemical vapor deposition (MCVD) process in which reactant gases are injected into a heated external circular tube to generate particles therein to adhere onto the inner wall of the external circular tube, and another gas is jetted through several holes in the vicinity of the front end of the internal tube to enhance deposition efficiency and reduce tapered entry length.

2. Description of the Related Art

An optical fiber transmits a light signal and is comprised of a core having a high refractive index and an outer clad surrounding the core. Such an optical fiber can be generally produced by MCVD (modified CVD), OVD (outside vapor deposition) or VAD (vapor axial deposition). In particular, MCVD is most widely used in fabricating optical fibers since the mechanism of generation and deposition of particles are clearly understood and the reaction occurring inside a quartz tube enables to reduce contaminants. An example of MCVD is illustrated in FIG. 1.

Referring to FIG. 1, a circular tube 10 having a diameter of 10~30 mm, e.g., a quartz tube, is installed to be rotatable at a speed of 60~120 rpm. The circular tube 10 is heated at 1600~1800° C. by a torch 11 moving in a direction along the axis of the circular tube 10. The torch 11 moves at a low speed of 10~30 cm/min. Here, mixed reactant gases such as $SiCl_4$, $GeCl_4$, $POCl_3$, $BCl_3$, $O_2$, etc. are supplied through the entrance of the circular tube 10. These gases reach a reaction area (R) in a portion heated by the torch 11 to induce a chemical reaction, thereby creating fine particles, e.g., $SiO_2$, $GeO_2$, $P_2O_5$, $BCl_3$, etc. Once a particle is formed at a given radial position within the tube 10, a particle trajectory results from the thermophoretic force generated in the radial direction of the circular tube 10 by the temperature field. Initially, the particles move inward since temperature of the inner wall of the tube 10 is hotter than the gas temperature. Farther downstream from the torch 11, the wall is cooler than the gas and particles move toward the tube wall. Thus, these particles are deposited on the wall, to then form a glass layer 12. Certain trajectories near the wall result in deposition, while particles near the center are swept out of the tube.

Subsequently, the glass layer 12 is heated by the moving torch 11, to be sintered into a glassy material. When the torch 11 reaches the end of the circular tube 10, it returns to its starting position and the above-described procedure is repeated, thereby allowing the glass layer 12 to have a multilayered structure. The composition of the each layer 12 is controlled by altering the relative concentration and species of reactant gases according to the particular objective of the fiber such as single-mode fiber, multi-mode fiber, erbium-doped fiber or special fibers.

If the glass layer 12 is formed to a desired thickness, introduction of reactant gases is terminated and the circular tube 10 is heated by the torch 11 to 2,000° C. or higher. Then, the circular tube 10 shrinks into a rod shape due to surface tension to be the preform of an optical fiber. The preform is heated in a furnace, drawn to be a fine wire shape, and then coated, thereby completing the optical fiber.

However, in the MCVD process, since the axial velocity of particles near the center of the tube is relatively large compared to the thermophoretic velocity and concentration of the particles is high near the center, a large amount of particles are swept out of the tube, which results in a low particle deposition efficiency. Also, as shown in FIG. 1, the particles produced in the reaction area (R) travel along loci 13 indicated by solid lines in the drawing. That is, the traveling path of a particle until it adheres to the inner wall of the circular tube is long, which increases the distance between a point at which particles initially adhere to the circular tube and a point at which the thickness of the glass layer 12 becomes a constant level, which will be referred to as a tapered entry section (L). The tapered entry section (L) is not useful for making optical fibers and the portion corresponding to the tapered entry section (L) must be cut out.

In order to increase the particle deposition efficiency, particles are produced by installing a heating element inside the circular tube 10, as disclosed in Sinclair, et al. (U.S. Pat. No. 4,263,032) and Buehl (U.S. Pat. No. 4,328,017). However, since the particles produced by these methods are also deposited on the inner wall of the circular tube after they travel a considerable distance along the tubular axis, it is known that the aforementioned tapered entry section (L) cannot be reduced.

To overcome this drawback, a method of reducing the tapered entry section is taught in the Korean Patent Laid-open Gazette No. 96-41134 (Dec. 19, 1996). As shown in FIG. 2, an internal tube 20 serving as a heating element is inserted into an external tube 10 into which reactant gases are injected, and high-temperature gases are radially jetted from the peripheral surface in the vicinity of the front end 23 of the internal tube 20. In other words, a plurality of jet holes 22 leading to a bore 21 are radially formed on the peripheral surface in the vicinity of the front end 23 of the internal tube 20. Gases, e.g., $O_2$, supplied through the bore 21 are radially jetted through the jet holes 22. The gas jets form a film around the internal tube 20, exerting the effect of enlarging the internal tube 20. Also, since the gas jets are in a high-temperature, a high temperature gradient can be achieved. Thus, thermophoretic velocity of particles are increased due to the increased temperature gradient. In addition, gas jetting through the jet holes 22 drives particles to the inner wall of the external tube. Consequently, the increased radial velocity of particles due to the gas jet increases deposition efficiency. Above all, since the flow loci of the particles generated from the reactant gases are reduced in length, a tapered entry section L' can be noticeably reduced, as shown in FIG. 2.

However, it is known that the above-described optical fiber fabrication method using an inner jet is not actually effective in view of particle deposition efficiency, compared to the conventional MCVD process. In detail, in the MCVD process using inner annular jets, the particles created in the reaction area (R) tend to collide with and stick onto the front end 23 of the internal tube 20 while moving toward the inner wall of the external tube 10. The collision of particles results in accumulation of the particles around the front end 23 and the amount of accumulated particles gradually increases. Finally, the accumulated particles obstruct the jet holes 22 of the internal tube 20, which may impede smooth jetting.

SUMMARY OF THE INVENTION

To solve the above problems, it is an objective of the present invention to provide an apparatus and method for manufacturing optical fibers having an improved particle deposition efficiency by providing a separate jet hole for supplying jets to the front end of an internal tube to prevent accumulation of reactant particles and to induce smooth flow of the reactant particles.

To achieve the above objective of the present invention, an apparatus is provided for manufacturing optical fibers. The apparatus includes an external circular tube into which reactant gases are introduced from an entrance at one end thereof. An internal circular tube is inserted into the external circular tube through an exit at the other end of the external circular tube. The internal circular tube has a bore to which gas jets are supplied. Jet holes are formed to lead to the bore on the outer circumferential surface in the vicinity of the front end of the internal circular tube. The jet holes are for radially jetting the gas jets. An auxiliary jet hole is formed at the front end of the internal circular tube to lead to the bore. The auxiliary jet hole is for jetting the gas jets frontward. A torch is installed to reciprocate along the axial direction of the external circular tube, for heating the external circular tube to induce a chemical reaction of the reactant gases to thus generate particles.

The optical fiber manufacturing apparatus may further include means for heating the internal circular tube.

According to another aspect of the present invention, there is provided a method for manufacturing optical fibers using an optical fiber manufacturing apparatus. The apparatus includes an external circular tube and an internal circular tube positioned within the external circular tube. The internal circular tube has jet holes and an auxiliary jet hole. The jet holes are formed on the circumferential surface to lead to a bore, in the vicinity of the front end thereof. The auxiliary jet hole is formed at the front end thereof. A torch is installed to reciprocate along the axial direction of the external circular tube. The method includes the steps of injecting reactant gases from the entrance at one end of the external circular tube; heating the external circular tube with the torch to thereby generate particles from the reactant gases; and supplying gas jets to the bore of the internal circular tube to radially jet the gas jets through the jet holes and to jet the same through the auxiliary jet hole in a direction opposite to the direction of flow of the reactant gases.

This method can also be used to manufacture optical fiber amplifier by injecting rare-earth-materials-doped gases to the bore of the internal circular tube or by placing rare earth materials inside the internal circular tube.

BRIEF DESCRIPTION OF THE DRAWINGS

The above objective and advantages of the present invention will become more apparent by describing in detail a preferred embodiment thereof with reference to the attached drawings in which.

DESCRIPTION OF THE PREFERRED EMBODIMENTS

Figure 1:
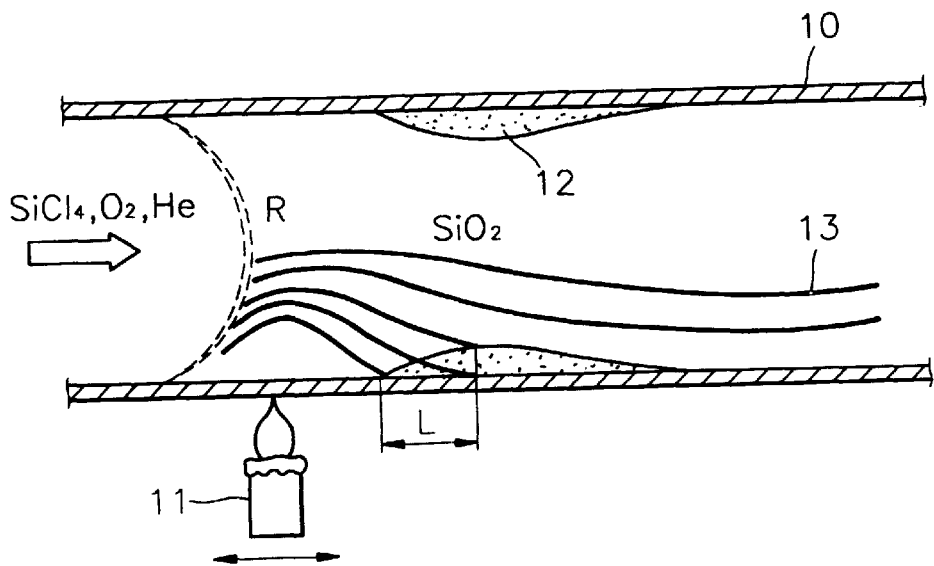
FIG. 1 is a cross-sectional view illustrating a conventional apparatus for manufacturing optical fibers.
Figure 2:
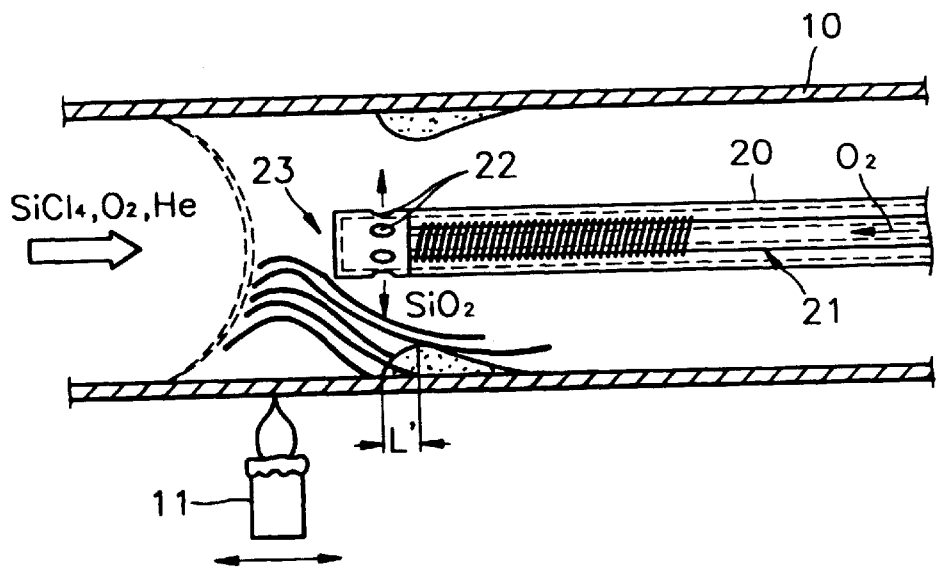
FIG. 2 is a cross-sectional view illustrating a conventional apparatus for manufacturing optical fibers using inner annular jets.
Figure 3:
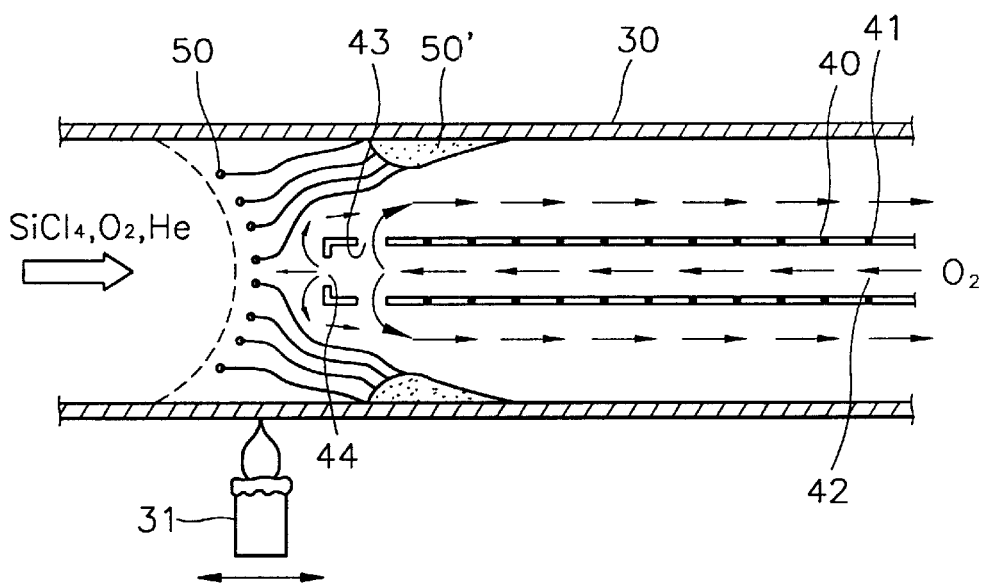
FIG. 3 is a cross-sectional view illustrating an apparatus for manufacturing optical fibers using inner annular jets according to the present invention.

FIG. 3 illustrates an apparatus for manufacturing optical fibers using inner annular jets according to the present invention. As shown in FIG. 3, the optical fiber manufacturing apparatus includes an external circular tube 30 such as a quartz tube and an internal circular tube 40 inserted into the external circular tube 30.

The external circular tube 30 installed on a lathe (not shown) rotates at a low speed of about 60~120 rpm. Reactant gases such as $SiCl_4$, $GeCl_4$, $POCl_3$, $O_2$, etc. are introduced into the entrance of the external circular tube 30. The relative concentrations and species of the reactant gases could be altered according to the particular objective of the fiber such as single-mode fiber, multi-mode fiber, erbium-doped fiber or special fibers.

The internal circular tube 40 is inserted into the external circular tube 30 in a direction opposite to the flow direction of the reactant gases and is heated by a heating means. The heating means includes a heating coil 41 installed along the circumference of the internal circular tube 40. The heating means is not limited to this embodiment but general heating systems including heating systems using electromagnetic induction or combustion of gas fuels, disclosed in Korean Patent Laid-open Gazette No. 96-41134, may be alternatively adopted. In addition, species of inner jetting gas is also not limited to this embodiment. For example, for fabrication of special optical fibers or Erbium-doped fiber, special dopant such as erbium could be supplied through the entrance of the external circular tube or alternatively jetted through the internal circular tube 40 after placing rare earth materials inside the internal tube and heating up to high temperature by the heating means.

Also, a bore 42 into which gas jets such as He, $O_2$, etc. are injected is formed in the internal circular tube 40. A plurality of jet holes 43 leading to the bore 42 are radially formed on the outer circumference, in the vicinity of the front end of the internal circular tube 40. Jet gases are radially jetted through the jet holes 43 and axially through the auxiliary hole 44. Each of the jet holes 43 is preferably elliptic in shape having a larger radius of about 2 mm and a smaller radius of about 1 mm. Also, the number and size of the jet holes 43 could be differently optimized according to the sizes of the external and the internal circular tubes 30 and 40, and the flow rate of the reactant gases.

The feature of the present invention lies in that an auxiliary jet hole 44 is formed at the front end of the internal circular tube 40 so as to jet jet gases frontward. The auxiliary jet hole 44, as will be described later, pushes particles generated by the reactant gases injected into the external circular tube 30 toward the inner wall of the external circular tube 30 to prevent particles from sticking onto the front end of the internal circular tube 40, and preferably has a diameter of about 1 mm and the size could be also altered with respect to the size of the jet holes 43.

Also, a torch 31 for heating the external circular tube 30 while linearly moving in a direction along the axis of the tube is installed outside the external circular tube 30.

The operation of the optical fiber manufacturing apparatus having the above-mentioned configuration and a method for manufacturing optical fibers will now be described.

First, while the external circular tube 30 is rotated at a constant rotation speed, reactant gases such as $SiCl_4$, $GeCl_4$, $POCl_3$, $BCl_3$, $O_2$, etc. are injected into the entrance thereof. Here, the external circular tube 30 is heated by the axially moving torch 31. Then, the internal circular tube 40 is inserted into the external circular tube 30 through the exit of the external circular tube 30 so that the front end of the internal circular tube 30 is situated in the vicinity of the torch 31. The internal circular tube 40 is heated by the heating coil 41, and gas jets, e.g., He, $O_2$, etc. are injected into the bore 42.

The supplied gas jets are heated in the internal circular tube 40 to a high temperature. Then, most of the gas jets are radially jetted through the jet holes 43 and some of them are jetted frontward through the auxiliary jet hole 44. The traveling path of the gas jets supplied through the jet holes 43 and the auxiliary jet hole 44 is indicated by arrows shown in FIG. 3. Here, if the diameter of the auxiliary jet hole 44 is too large, the amount of the gas jets supplied frontward may be excessive. Thus, the auxiliary jet hole 44 preferably has a diameter smaller than that of each of the jet holes 43.

The reactant gases injected into the external circular tube 30 are oxidized in the reaction area (R) to be converted particles 50 such as $SiO_2$, $GeO_2$, $P_2O_5$, $B_2O_3$, etc. The particles 50 travel along the loci indicated by solid lines in FIG. 3 and are deposited on the inner wall of the external circular tube 30 to form the glass layer 50'. In other words, the trajectories of the particles 50 is shifted toward the inner wall of the external circular tube 30 by the gas jets supplied frontward through the auxiliary jet hole 44 and is pushed and shifted further toward the inner wall by the gas jets supplied through the jet holes 43. The jetting by means of the auxiliary jet hole 44 shifts the trajectories of the particles 50 toward the inner wall, thereby further enhancing the particle deposition efficiency.

Subsequently, the glass layer 50' is sintered by heating the same using the torch 31.

Specific effects of the apparatus and method for manufacturing optical fibers according to the present invention can be more clearly understood through the following experimental example.

Experiments

The length of the external circular tube (30 of FIG. 3) used in this experiment was 1.0 m, the outer diameter thereof was 25 mm and the inner diameter thereof was 19 mm. The traversing speed of the torch 31 was 15 cm/min, the maximum heating temperature thereof was 1,700° C. and the movement distance thereof was 50 cm. The temperature of the reactant gases injected into the entrance of the external circular tube 30 was 26° C., and the flow rate of $O_2$ among the reactant gases was 0.5 liter/min. Using the external circular tube of the above dimensions, optical fiber preforms were fabricated by the conventional MCVD process and inner jet MCVD process.

In order to manufacture optical fibers according to the present invention, in addition to the external circular tube 30 of the dimension described above, the internal circular tube 40 having a length of 1.3 m, an outer diameter of 10 mm and an inner diameter of 6 mm was used. The gas jets supplied into the internal circular tube 40 was helium and the flow rate thereof was varied from 0.5 liter/min to 1.5 liter/min.

Figure 4:
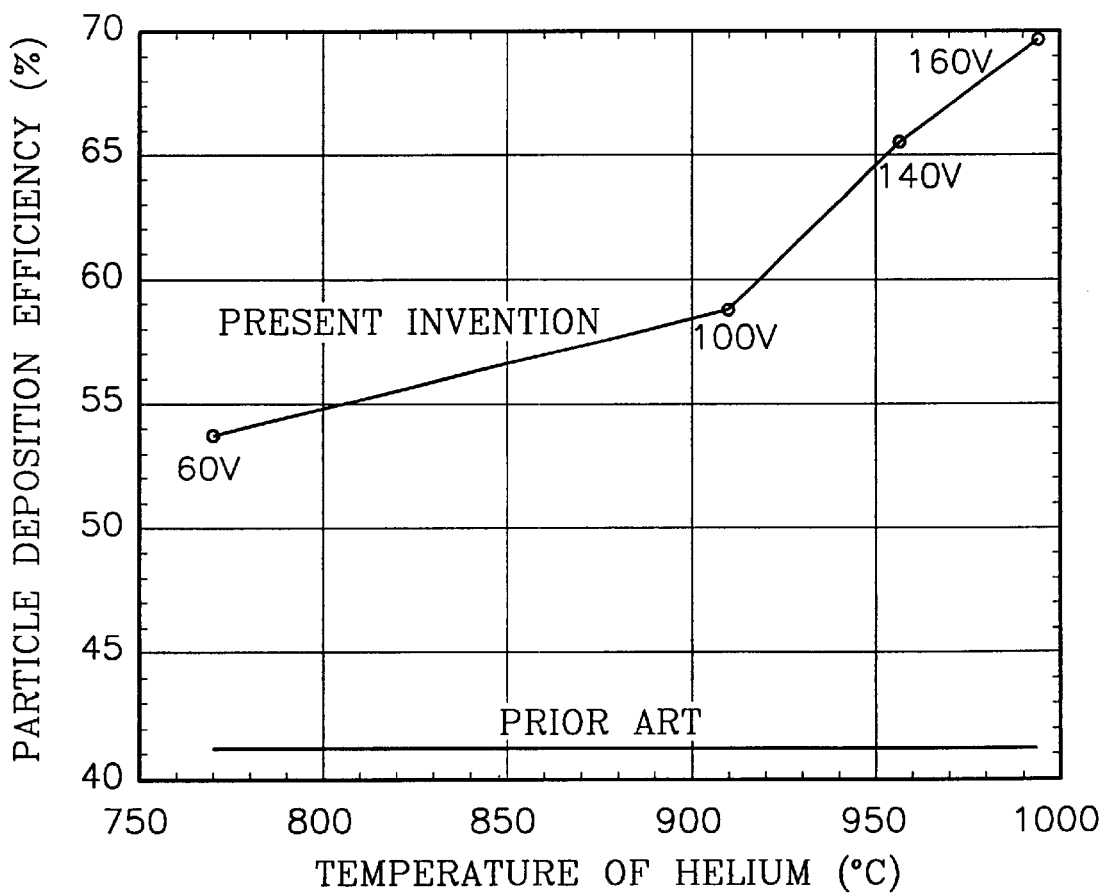
FIG. 4 is a graph illustrating the relationship between the particle deposition efficiency and the temperature of gas jets according to the present invention, compared to the prior art.
Figure 5:
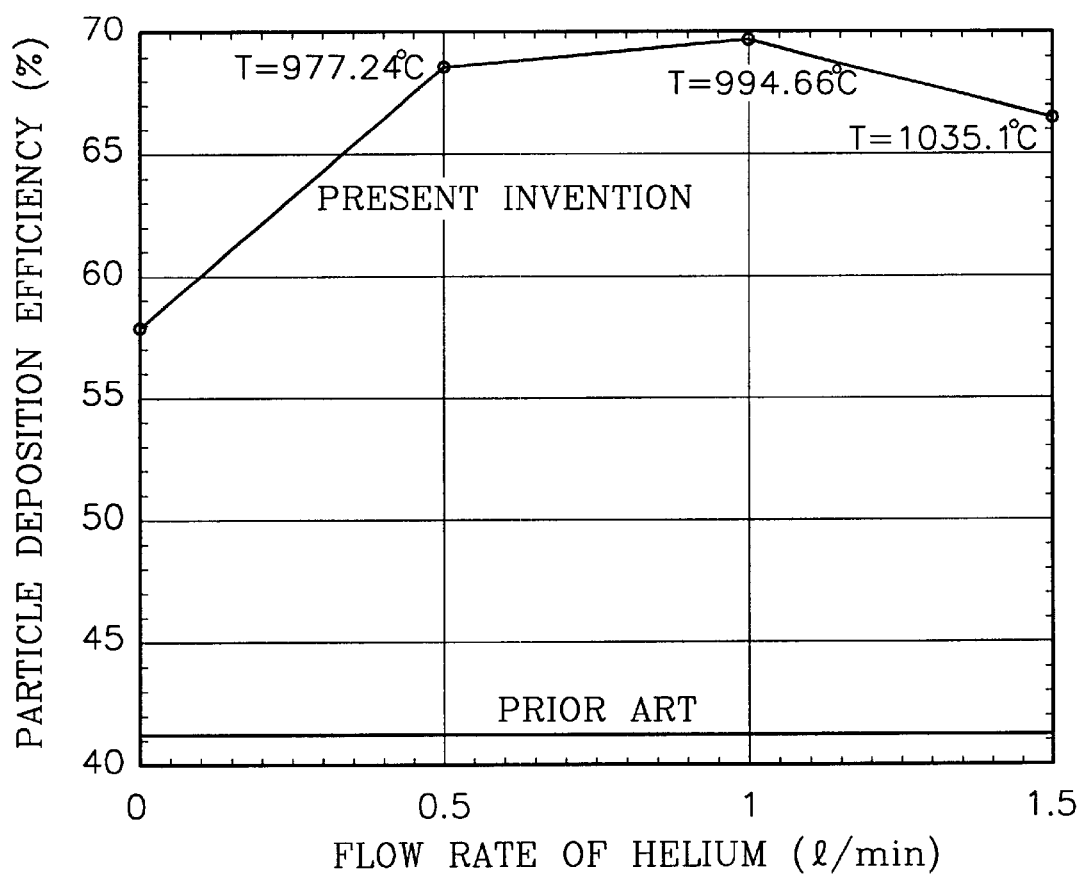
FIG. 5 is a graph illustrating the relationship between the particle deposition efficiency and the flow rate of gas jets according to the present invention, compared to the prior art.

The results of the experiment carried out under the above conditions are shown in FIGS. 4 and 5. FIG. 4 shows the particle deposition efficiency depending on the temperature of gas jets supplied through the internal circular tube 40. As understood from the graph shown in FIG. 4, the particle deposition efficiency of the MCVD process according to the present invention was noticeably improved, compared to that of the conventional MCVD process according to the prior art, which is believed to be attributed to the auxiliary jet hole 44 which prevents particles from being deposited around the front end of the internal circular tube 40 and further increases the radial driving force on the moving particles. The voltages shown in the graph of FIG. 4 indicate voltages applied to the heating coil 41 of the internal circular tube 40.

FIG. 5 shows the particle deposition efficiency depending on the flow rate of gas jets (He) supplied through the internal circular tube 40. Referring to FIG. 5, the particle deposition efficiency according to the MCVD process of the present invention was noticeably higher than that according to the MCVD process of the prior art. As the flow rate of the gas jets was increased up to 1 liter/min, the particle deposition efficiency increases. At the higher flow rate of the gas jets, the particle deposition efficiency became decreased. The temperatures indicated in the graph of FIG. 5 are the temperatures of the gas jets.

According to the apparatus and method for manufacturing optical fibers of the present invention, an auxiliary jet hole is formed at the front end of an internal circular tube acting as a heating element and gas jets are jetted in a direction opposite to the direction of flow of the reactant gases, thereby providing a radial driving force with respect to the particles generated in a reaction area and preventing the particles from being deposited around the front end of the internal circular tube. Therefore, the deposition efficiency of the particles deposited on the inner wall of the external circular tube can be improved.

It should be understood that the present invention has been described through the particular embodiment disclosed herein as the best mode contemplated for carrying out the invention, and that various additional modifications will occur to those skilled in the art within the scope of the invention.

What is claimed is:

1. An apparatus for manufacturing optical fibers comprising:
    an external circular tube having an entrance end into which reactant gases are introduced and having an exit end opposite the entrance end, the reactant gases flowing in a first direction from the entrance end of the external circular tube toward the exit end of the external circular tube;
    an internal circular tube inserted into the external circular tube through the exit end of the external circular tube, the internal circular tube comprising:
    a first end;
    a second end opposite the first end;
    an outer circumferential surface disposed between the first end and the second end;
    a bore, extending from the first end to the second end, into which gas is supplied to flow through the bore from the first end toward the second end;
    jet holes formed through the outer circumferential surface in the vicinity of the second end of the internal circular tube, the jet holes positioned to radially jet a first portion of the gas outward from the bore into the external circular tube; and
    an auxiliary jet hole forming a passage from the bore through the second end of the internal circular tube, the auxiliary jet hole positioned to jet a second portion of the gas frontward into the external circular tube in a second direction opposite the first direction in which the reactant gases flow; and
    a torch installed to reciprocate along the axial direction of the external circular tube, for heating the external circular tube to induce a chemical reaction of the reactant gases to thus generate particles.

2. The apparatus of ciaim 1, further comprising means for heating the internal circular tube.

3. A method for manufacturing optical fibers using an optical fiber manufacturing apparatus including an external circular tube, an internal circular tube positioned within an interior of the external circular tube, the internal circular tube having an outer circumferential surface, a bore, a plurality of radial jet holes and an auxiliary jet hole, the radial jet holes formed through the outer circumferential surface to lead to the bore in the vicinity of a front end of the internal circular tube, the auxiliary jet hole formed at the front end of the internal circular tube to lead from the bore of the internal circular tube to the interior of the external circular tube, and a torch installed to reciprocate along the axial direction of the external circular tube, the method comprising:

injecting reactant gases from an entrance at an entrance end of the external circular tube to flow in a first direction in the interior of the external circular tube;

heating the external circular tube with the torch to thereby generate particles from the reactant gases in the external circular tube; and supplying gas to the bore of the internal circular tube to radially jet outward a first portion of the gas through the radial jet holes and to jet a second portion of the gas forward through the auxiliary jet hole thereby exiting the second portion of the gas from the internal circular tube into the interior of the external circular tube in a second direction opposite to the first direction in which the reactant gases flow.

4. The method according to claim 3, farther comprising the steps of:

rotating the external tube; and heating the internal circular tube.

\* \* \* \* \*

UNITED STATES PATENT AND TRADEMARK OFFICE
CERTIFICATE OF CORRECTION

PATENT NO.   : 6,363,754 B2
DATED        : April 2, 2002
INVENTOR(S)  : Mansoo Choi et al.

It is certified that error appears in the above-identified patent and that said Letters Patent is hereby corrected as shown below:

Column 7,
Line 1, change "ciaim 1" to -- claim 1 --.

Column 8,
Line 13, change "farther" to -- further --.

Signed and Sealed this

Twenty-fifth Day of March, 2003

JAMES E. ROGAN
*Director of the United States Patent and Trademark Office*